Patented Aug. 26, 1952

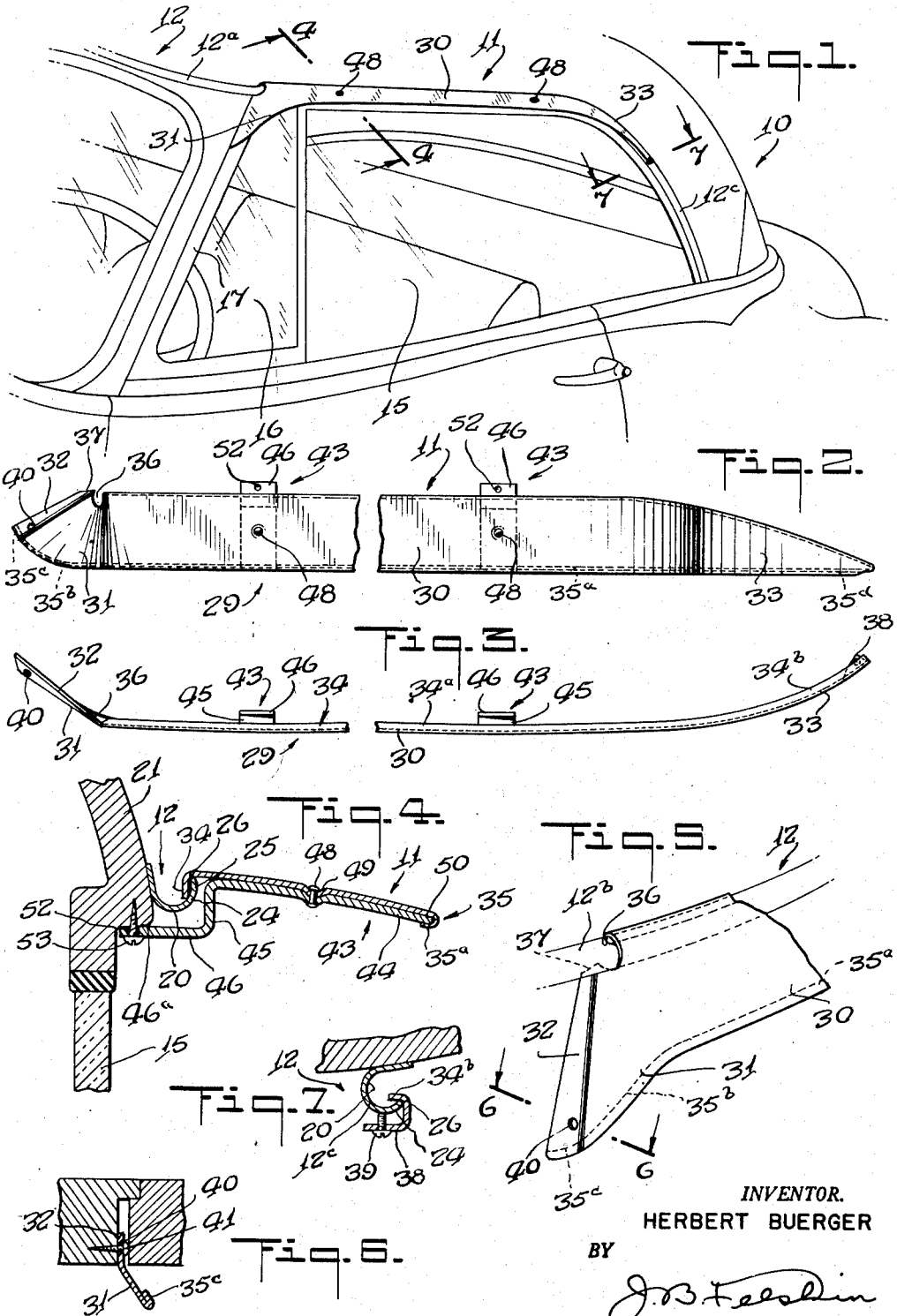

2,608,435

UNITED STATES PATENT OFFICE 2,608,435

AUTOMOBILE WINDOW VENTILATOR OR SIMILAR ARTICLE

Herbert Buerger, Walton, N. Y.

Application February 16, 1951, Serial No. 211,239

5 Claims. (Cl. 296—44)

1

This invention relates to automobile window ventilators.

One object of this invention is to provide a highly improved window ventilator provided with means for quick and easy attachment to the rain channel above the side windows of an automobile.

A further object of this invention is to provide a window ventilator of the character described having a pair of brackets so arranged that the rain channel may be gripped between the brackets and the underside of the ventilator, and said ventilator being provided with a flange engaging an edge of the rain channel, and said brackets being provided with screw means for fixing the ventilator to the rain channel.

A further object of this invention is to provide a ventilator of the character described having a portion running along the rain channel and a portion running along the front of the frame of the ventilating window of the automobile, and said ventilator being formed with a notch adjacent its front end through which the rain channel passes, and said ventilator being furthermore formed with holes at the ends thereof to receive attaching means engaging the automobile for attaching the ventilator to said automobile.

Yet a further object of this invention is to provide a highly improved ventilator which may be quickly and easily mounted on, or demounted from, a rain channel and front window molding of an automobile, and which will be positioned to keep out rain or snow or sleet, whereby to permit driving with the window open, and to keep out direct rays of the sun, and to hide small window openings.

A further object of this invention is to provide an improved window ventilator of the character described having a longitudinal front body portion provided with an upper longitudinal flange to engage the rain channel, said body having at its forward end a downwardly offset inclined portion extending to the front body portion, and said ventilator having a curved bent back flange at its lower edge rigidifying the ventilator throughout its length.

Yet a further object of this invention is to provide a strong, rugged and durable ventilator of the character described, which shall be relatively inexpensive to manufacture, attractive in appearance and yet practical and efficient to a high degree in use.

Other objects of this invention will in part be obvious and in part hereinafter pointed out.

The invention accordingly consists in the features of construction, combinations of elements, and arrangement of parts, which will be exemplified in the construction hereinafter described, and of which the scope of invention will be indicated in the following claims.

In the accompanying drawings in which is shown various illustrative embodiments of this invention, Fig. 1 is a partial perspective view of an automobile showing the side window provided with a ventilator embodying the invention;

Fig. 2 is a top plan view of the ventilator embodying the invention, removed from the automobile;

Fig. 3 is a top edge view of the ventilator shown in Fig. 2;

Fig. 4 is a cross-sectional view taken on line 4—4 of Fig. 1;

Fig. 5 is a partial perspective view of the front end portion of the ventilator embodying the invention;

Fig. 6 is a cross-sectional view taken on line 6—6 of Fig. 5; and

Fig. 7 is a cross-sectional view taken on line 7—7 of Fig. 1.

Referring now in detail to the drawing, 10 designates an automobile and 11 designates a ventilator embodying the invention, mounted thereon. The ventilator 11, embodying the invention, may be mounted on a number of various recent makes of automobiles.

These cars are provided with a rain channel 12 shown in Figs. 1, 4, 5 and 7 of the drawing. The rain channel 12 is attached to the front and sides of the car and follows the upper edge of the front windows as at 12a, follows the top of the side windows as at 12b and then curves downwardly and rearwardly following the downwardly and rearwardly curved portions of the side windows as at 12c.

In Fig. 1 the automobile 10 is shown with a side window 15 and with a front ventilating window 16. In Fig. 1 numeral 17 designates a molding or front frame portion for the side ventilating window 16. The rain channel 12 is curved in transverse cross-section and comprises a portion 20 extending from the automobile top 21, being fixed thereto in any suitable manner. The rain channel has an upwardly curved portion 24 formed with an inwardly projecting lip 25 having an edge 26. Such a rain channel is usual in a number of recent automobiles.

The ventilator 11 comprises a body 29 made of die stamped and pressed sheet metal. The body 29 comprises an elongated front body portion 30. The portion 30 is of substantially uniform width. At the forward end of the front body portion 30 is a forwardly and inwardly rounded portion 31 having a somewhat part-conical shape and extending from said portion 31 is an inwardly inclined portion 32. Extending rearwardly from the front body portion 30 is a downwardly curved position 33 decreasing in width towards its outer end. The portions 30 and 33 of the body portion 29 are formed at their upper edges with an inwardly extending flange 34 substantially at right angles to said portions 30, 33. The flange 34 engages rim edge 26 of the channel and projects into the channel as shown in Fig. 4 of the drawing.

Thus the flange 34 has a generally straight portion 34a at the upper end of body portion 30 and a downwardly curved portion 34b at the upper end of body portion 33. Flange portion 34a engages the rim edge 26 of channel portion 12b, whereas flange portion 34b engages the rim edge 26 of the rain channel portion 12c.

In Fig. 4 the ventilator 11 is shown in the position it assumes when attached to the rain channel of the automobile. In such position the body projects outwardly and downwardly. In such position, furthermore, the flange portions 34a, 34b are in a vertical plane. At the lower edge of the body 30 is an upwardly bent back flange 35 to reinforce and strengthen the ventilator throughout its length.

Thus the flange 35 extends along the lower edges of portions 30, 31, 32 and 33 of the body 29. Thus flange 35 has a straight portion 35a at the lower edge of the body portion 30. It has a curved portion 35b at the lower edge of the curved or conical wall 31, a portion 35c at the lower end of the portion 32, and a portion 35d at the lower edge of the body portion 33. It will be noted that the edge portion 35d is curved downwardly, rearwardly and inwardly when the ventilator is attached to the automobile body.

At the forward end of the body portion 30 and along its upper edge is a notch 36. The notch 36 permits the rain channel portion 12b to pass therethrough, leaving an upper edge portion 37 at the upper end of portion 32 which engages beneath the rain channel. The bent back flange 35 has a rear end portion 38 substantially parallel to the flange portion 34b and it is formed with a through opening to receive the screw 39 pressed against the rain channel to aid in holding the ventilator on the automobile. At the lower end of portion 32 is a hole 40 to receive a screw 41 engaging the automobile.

Attached to the undersurface of the ventilator body are a pair of parallel Z-shaped brackets 43 each having a portion 44 contacting said inner surface, and a portion 45 extending substantially at right angles to the portion 44 and disposed in spaced parallel relationship to the flange 34. Extending from portion 45 substantially at right angles thereto is a portion 46 extending beyond the flange 34. The portions 44 of the brackets 43 are fixed to the body by means of rivets 48 passing through registering openings in the bracket and body. The body may be recessed as at 49 to receive the rivet heads 48. The outer ends of portions 44 of the brackets are received within the flange portions 35a, as at 50, to aid in holding the brackets on the body.

It will now be understood that when the ventilator is attached to the rain channel, flange 34 engages rim 26 of the rain channel, whereas the portions 46 of the brackets engage beneath shoulders 46a of the body disposed above the window and below the rain channel. At the outer ends of said portions 46 are through openings 52 receiving drive screws 53 which are driven into shoulder 46a of the body of the automobile to hold the ventilator on the rain channel. By removing or loosening the screws 39, 41 and 53 the ventilators may be readily and easily removed. Thus the ventilator may be firmly clamped to the rain channel by quick and easy mounting. The ventilators may keep out rain or snow or sleet, thereby permitting driving with the window open, and it will also help to keep out direct rays of the sun and hide small window openings.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention I claim as new and desire to secure by Letters Patent:

1. An automobile window ventilator comprising a longitudinal body portion, a part-conical portion at the forward end of said longitudinal body portion, a rearwardly and downwardly curved portion at the rear end of said longitudinal body portion, said longitudinal body portion and rearwardly extending portion being formed with a flange at their upper edges, said part-conical portion being formed with a notch at its upper end, the lower end of said longitudinal body portion, conical portion and rearwardly extending body portion being formed with an inwardly upturned flange at their lower edges, a pair of spaced parallel brackets each having an arm contacting the undersurface of the longitudinal body portion, and an arm extending at right angles thereto, and another arm extending from the second arm substantially parallel to the first arm and extending beyond the top edge of said longitudinal body portion, and means to rivet the first arm of each bracket to said longitudinal body portion.

2. An automobile window ventilator comprising a longitudinal body portion, a part-conical portion at the forward end of said longitudinal body portion, a rearwardly and downwardly curved portion at the rear end of said longitudinal body portion, said longitudinal body portion and rearwardly extending portion being formed with a flange at their upper edges, said part-conical portion being formed with a notch at its upper end, the lower end of said longitudinal body portion, conical portion and rearwardly extending body portion being formed with an inwardly upturned flange at their lower edges, a pair of spaced parallel brackets each having an arm contacting the undersurface of the longitudinal body portion, and an arm extending at right angles thereto, and another arm extending from the second arm substantially parallel to the first arm and extending beyond the top edge of said longitudinal body portion, and means to rivet the first arm of each bracket to said longitudinal body portion, the lower end of the first arm of each bracket being received within the inwardly upturned flange at the lower end of said longitudinal body portion.

3. An automobile window ventilator comprising a longitudinal body portion, a part-conical portion at the forward end of said longitudinal body portion, a rearwardly and downwardly curved portion at the rear end of said longitudinal body portion, said longitudinal body portion and rearwardly extending portion being formed with a flange at their upper edges, said part-conical portion being formed with a notch at its upper end, the lower end of said longitudinal body portion, conical portion and rearwardly extending body portion being formed with an inwardly upturned flange at their lower edges, a pair of spaced parallel brackets each having an arm contacting the undersurface of the longitudinal body portion, and an arm extending at right angles thereto, and another arm extending from the second arm substantially parallel to the first arm and extending beyond the top edge of said longitudinal body portion, and means to rivet the first arm of each bracket to said longitudinal body portion, the lower end of the first arm of each bracket being received within the inwardly upturned flange at the lower end of said longitudinal body portion, the third arm of each bracket being formed with a screw threaded opening and a screw secured therein.

4. An automobile window ventilator comprising a longitudinal body portion, a part-conical portion at the forward end of said longitudinal body portion, a rearwardly and downwardly curved portion at the rear end of said longitudinal body portion, said longitudinal body portion and rearwardly extending portion being formed with a flange at their upper edges, said part-conical portion being formed with a notch at its upper end, the lower end of said longitudinal body portion, conical portion and rearwardly extending body portion being formed with an inwardly upturned flange at their lower edges, a pair of spaced parallel brackets each having an arm contacting the undersurface of the longitudinal body portion, and an arm extending at right angles thereto, and another arm extending from the second arm substantially parallel to the first arm and extending beyond the top edge of said longitudinal body portion, and means to rivet the first arm of each bracket to said longitudinal body portion, the lower end of the first arm of each bracket being received within the inwardly upturned flange at the lower end of said longitudinal body portion, the third arm of each bracket being formed with a screw threaded opening and a screw secured therein, said ventilator being formed with an opening adjacent its front end.

5. An automobile window ventilator comprising a longitudinal body portion, a part-conical portion at the forward end of said longitudinal body portion, a rearwardly and downwardly curved portion at the rear end of said longitudinal body portion, said longitudinal body portion and rearwardly extending portion being formed with a flange at their upper edges, said part-conical portion being formed with a notch at its upper end, the lower end of said longitudinal body portion, conical portion and rearwardly extending body portion being formed with an inwardly upturned flange at their lower edges, a pair of spaced parallel brackets each having an arm contacting the undersurface of the longitudinal body portion, and an arm extending at right angles thereto, and another arm extending from the second arm substantially parallel to the first arm and extending beyond the top edge of said longitudinal body portion, and means to rivet the first arm of each bracket to said longitudinal body portion, the lower end of the first arm of each bracket being received within the inwardly upturned flange at the lower end of said longitudinal body portion, the third arm of each bracket being formed with a screw threaded opening and a screw secured therein, said ventilator being formed with an opening adjacent its front end, the inwardly upturned flange at the lower end of said rearwardly extending portion being formed with an opening at its outer end.

HERBERT BUERGER.

REFERENCES CITED

The following references are of record in the file of this patent:

UNITED STATES PATENTS

| Number | Name | Date |
| --- | --- | --- |
| D. 153,190 | Thrailkill | Mar. 22, 1949 |
| 2,034,342 | Hay | Mar. 17, 1936 |
| 2,134,054 | Mabey | Oct. 25, 1938 |
| 2,350,297 | Vesta | May 30, 1944 |

OTHER REFERENCES

Motor (magazine), vol. 92, issue No. 5, page 111, Nov. 1949, "Auto Ventshade Side Visors."